United States Patent [19]

Horowitz et al.

[11] Patent Number: 4,784,458
[45] Date of Patent: Nov. 15, 1988

[54] OPTICALLY ALIGNED SPLICE FOR OPTICAL FIBERS

[75] Inventors: Leo Horowitz, Highland Park; Eric E. Hubner, Jersey City; Herbert T. Califano, Bloomingdale; Walter V. Werner, Caldwell, all of N.J.

[73] Assignee: Allied-Signal Inc., Morris Township, Morris County, N.J.

[21] Appl. No.: 809,351

[22] Filed: Dec. 16, 1985

[51] Int. Cl.⁴ .................................................. G02B 6/38
[52] U.S. Cl. ............................... 350/96.21; 350/96.22
[58] Field of Search .............. 350/96.15, 96.20, 96.21, 350/96.22, 96.30

[56] References Cited

U.S. PATENT DOCUMENTS

| | | | |
|---|---|---|---|
| 3,800,388 | 4/1974 | Borner et al. | 29/200 P |
| 4,049,414 | 9/1977 | Smith | 65/4 B |
| 4,215,937 | 8/1980 | Borsuk | 356/73.1 |
| 4,321,072 | 3/1982 | Dubos et al. | 65/3.11 |
| 4,362,943 | 12/1982 | Presby | 250/459.1 |
| 4,390,897 | 1/1983 | Smithgall, Sr. | 358/101 |
| 4,468,117 | 8/1984 | Hartouni et al. | 356/73.1 |
| 4,487,475 | 12/1984 | Ogawa | 350/96.21 |
| 4,506,947 | 3/1985 | Tatekura et al. | 350/96.21 |
| 4,526,438 | 7/1985 | Essert | 350/96.20 |
| 4,544,234 | 10/1985 | DeVeau, Jr. et al. | 350/96.21 |
| 4,545,643 | 10/1985 | Young et al. | 350/96.20 |

FOREIGN PATENT DOCUMENTS

| | | | |
|---|---|---|---|
| 0137720 | 4/1985 | European Pat. Off. | 350/96.20 |
| 0120214 | 7/1983 | Japan | 350/96.20 |
| 0019902 | 2/1984 | Japan | 350/96.20 |
| 0038709 | 3/1984 | Japan | 350/96.20 |

*Primary Examiner*—Gene Wan
*Attorney, Agent, or Firm*—Howard G. Massung

[57] ABSTRACT

A splice joint is effected between single mode polarization maintaining (SMPM) fibers (31, 32) in a manner so as to maintain polarization of light transmitted through the splice. Mating ends (57, 58) of the respective fibers (31, 32) are aligned and joined with ultraviolet curing epoxy (61). After the ultraviolet curing epoxy (61) is cured, five-minute epoxy (63) is applied over the joint so as to effect mechanical rigidity of the joint. In one arrangement, the five-minute epoxy is reinforced with a sleeve (55).

Advantages include the ability to simplify splicing of SMPM fibers, while maintaining polarization characteristics of the fibers.

16 Claims, 1 Drawing Sheet

OPTICALLY ALIGNED SPLICE FOR OPTICAL FIBERS

FIELD OF THE INVENTION

This invention relates to optical transmission fibers and more specifically to splicing of such fibers in a manner compatible with maintaining polarization in single mode polarization maintaining (SMPM) optical fibers.

BACKGROUND OF THE INVENTION

Single mode polarization maintaining (SMPM) optical fibers are used in order to transmit polarized light and polarized coherent light, while maintaining the polarization of the light. Such fibers typically consist of a single strand core surrounded by cladding material. Within the cladding material are stress rods which help maintain polarization. One application for such SMPM fibers is in fiber optic gyroscopes. Fiber optic gyroscopes detect interference patterns in light transmitted through an optical fiber.

FIG. 1 shows a cross-section of a single mode optical transmission fiber 11. Light is transmitted through a core 13 which is approximately 5 $\mu$m (microns) ($5 \times 10^{-6}$M) in diameter. The core 13 is surrounded by a cladding material 15 which is typically 75 to 125 $\mu$m in diameter. The cladding 15 has a different index of refraction from the core 15, facilitating transmission of light through the core 13. Cladding 15 also provides structural strength to the fiber 11. FIG. 2 shows a cross-section of single mode polarization maintaining (SMPM) optical transmission fiber 21. The SMPM fiber includes a core 23 surrounded by cladding 25 in a manner similar to that of the conventional single mode fiber 11 of FIG. 1. In order to enable the SMPM fiber 21 to maintain polarization of light transmitted through it, a pair of stress rods 27, 29 are located in the cladding 25. It is believed that the stress rods 27, 29 induce stress in the cladding 25 and/or core 23 so that the fiber 21 maintains the desired polarization.

Optical fibers hve been spliced with mechanical connectors, with gluing techniques and by arc plasma bonding. In the case of single mode fibers, two fiber ends are brought into alignment by relative movement of a pair of platforms. At least one of the platforms is finely moveable along three orthogonal axes. The output light from a light source is injected into one of the fibers to be joined. The incident light passes through the one fiber to the other fiber and is received by an optical detector associated with the other fiber. Core alignment is effected by monitoring the optical power transmitted to the optical detector through the fibers while, at the same time, moving the moveable platform to a point at which optical power indicated by the optical detector reaches its maximum. When such alignment has been completed, a plasma arc is used to effect a splice in the manner described by Smith in U.S. Pat. No. 4,049,414. This technique results in a firmly bonded joint which has good structural integrity and optical transmission qualities. Unfortunately, when used with SMPM fiber, the arc plasma results in damage to the fiber and loss of the ability for the spliced fiber to maintain polarization. Apparently when attempting to use a plasma arc on SMPM fibers, small explosions occur. Consequently, glue bonding is attempted.

In order for glue bonding to work, the glue joint must be relatively large in order to maintain mechanical strength of the fiber at the joint. This results in a corresponding loss of optical transmission capacity. Furthermore, adjustable platforms use a vacuum in order to hold the fiber ends in position on the platforms until the splice is complete. This vacuum results in a certain amount of vibration and instability at the fiber ends at the time of adjusting the positions of the fiber ends and at the time of bonding.

Fiber splices often include fibers from different manufacturers often have different dimensions. Therefore, a splicing technique must accomodate such differences.

It is therefore desired to provide a fiber splice which may be applied to SMPM fibers without damaging the fiber ends. It is desirable to provide a splice that is capable of maintaining polarization of light transmitted through SMPM fiber. It is also important to maintain structural rigidity of the fiber and to provide an inexpensive splice in a non-complicated manner.

SUMMARY OF THE INVENTION

In accordance with the present invention, optical transmission fiber such as single mode polarization maintaining (SMPM) fiber is spliced with the aid of positioner platforms. The fiber ends to be spliced are aligned by optimizing light output from a light source, associated with one fiber section, as received by a corresponding detector associated with the other fiber section. A small amount of ultraviolet curing epoxy is placed on the fiber ends to be spliced so as to form a connection between the spliced ends. When the fiber ends are optimally aligned, as indicated by the light detector, actinic light is used to cure the epoxy.

In order to secure the splice, five-minute epoxy is used to reinforce the joint. In a preferred embodiment, the splice is further reinforced with a sleeve made from a glass tube. In that embodiment, the epoxy is applied by sliding a glass tube over the joint and allowing the epoxy to flow between the fibers at the joint and the glass tube.

Advantages include relative simplicity in splicing polarization-maintaining optical fibers, while establishing a rigid low-cost and reliable joint.

DETAILED DESCRIPTION OF THE PREFERRED EMBODIMENTS

Figure 1:
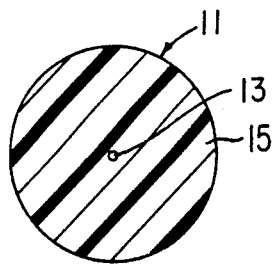
FIGS. 1 and 2 show cross-sections of single mode optical transmission fiber. The cross-section in FIG. 1 is that of a single mode non-polarization maintaining fiber. The cross-section in FIG. 2 is that of a single mode polarization maintaining (SMPM) fiber.
Figure 2:
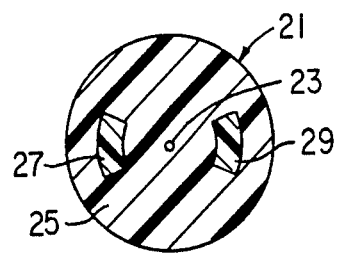

The present invention is used to splice optical transmission fiber such as the single mode optical fibers 11, 21 shown in FIG. 1 and 2, respectively. Such fibers 11, 21 include a single strand core 13, 23, surrounded by cladding 15, 25. The cladding 15, 25 has an index of refraction which, when used with a particular core 13, 23, causes light to be conducted substantially through the core 13, 23 and cladding 15, 25.

The diameter of the core 13, 23 is typically approximately 5 μm (microns) ($5 \times 10^{-6}$M). The diameter of the cladding 15, 25, and consequently of the fiber 11, 21 typically ranges from 75 to 125 μm.

Figure 3:
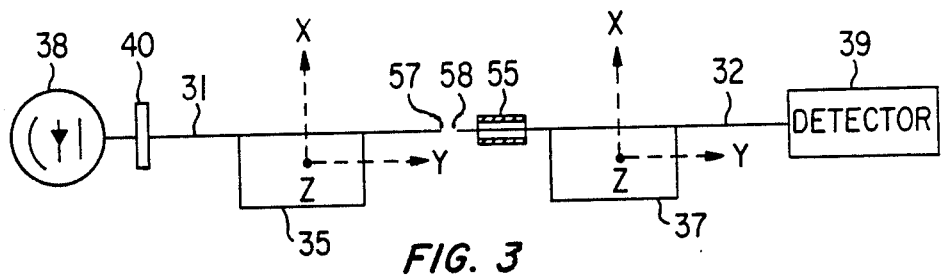
FIG. 3 shows an arrangement for positioning optical fiber for effecting a splice in accordance with a preferred embodiment of the invention.

Single mode polarization maintaining (SMPM) fiber 21 also includes means to maintain polarization of light transmitted through. One such means are a pair of stress rods 27, 29 which are incorporated into the cladding material 25. When splicing SMPM fibers, it is necessary to effect a joint in a way as not to affect the structure of the fiber 21 at the spliced end. FIG. 3 shows an arrangement by which a pair of fibers 31, 32 are spliced together. The fibers 31, 32 are each mounted to a jig consisting of positioning platforms 35, 37 in order that their relative positions can be adjusted. A light source 38 is fixed to one of the fibers 31 to be spliced so as to provide a constant light output in that fiber 31. When the fibers 31, 32 are properly aligned, a detector 39 attached to the fiber 32 detects light generated by light source 38 and provides a suitable indication. When the alignment of the fibers 31, 32 are optimized, the output of detector 39 is maximized.

The jig 35, 37 is provided with vacuum holding means for the fibers 31, 37, but this has been found to result in vibration during alignment. Consequently, ordinary scotch tape is used in order to secure the fibers 31, 32 to the jig 35, 37.

Axial alignment of the cores 23 (not shown in FIG. 3) of the fiber 31, 32 are effected by the adjustment of the positions of the fibers 31, 32 by the positioners 35, 37 with the aid of the indication of detector 39. It is also possible to angularly adjust the jig 35, 37 so that optimum transmission of polarized light occurs. To assist this, a polarizer 40 provides polarized light to the fibers 31, 32.

Figure 4:
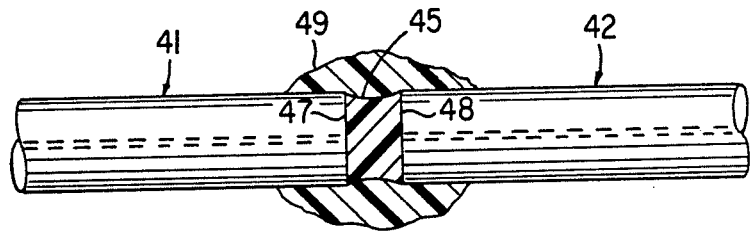
FIG. 4 shows details of the splice effected in accordance with one embodiment of the invention.

FIG. 4 shows details of a splice 40 made between two fibers 41, 42. The fibers 41, 42 are assembled with the aid of a jig 35, 37 as described above for fibers 31 and 32. As seen in FIG. 4, when the splice is to be made between two fiber sections 41, 42, ultraviolet curable epoxy glue 45 is applied to the fiber ends 47, 48. The ultraviolet curable epoxy has a low viscocity prior to cure and, prior to cure, remains in positions as a meniscus between the two fiber sections 41, 42. While shown in FIG. 4 as a concave meniscus, there have also been instances where the ultraviolet epoxy has been compressed sufficiently to appear as an expanded area between the ends 47, 48. When alignment of the fiber ends 47, 48 is optimized, the ultraviolet curable epoxy is cured with actinic light. This glue joint does not provide sufficient mechanical strength to maintain the splice 40. Therefore, additional reinforcement is effected at the joint by apply five-minute epoxy glue 49. The five-minute epoxy 49 is preferably the type in which equal amounts of viscous material from two tubes are mixed and applied within a short time period of approximately one minute at room temperature. The glue joint is generally considered to be stable within five minutes. The epoxy may then be left to completely cure by itself or may be mildly heated in order to accelerate final cure. In the preferred embodiment, the five-minute epoxy is a product sold as "Foxy Poxy" (a trademark), available from Channel Lumber and Hardware in Paramus, N.J., although most commercially available five-minute epoxy glues of this type would probably be suitable.

The five-minute epoxy tends to distort during the curing process and therefore creates mild stresses. These stresses and its relatively high viscosity make the five minute epoxy incompatable with aligning the optical fiber sections 41, 42. The ultraviolet curing epoxy 45, on the other hand, does not distort during cure and its low viscosity facilitates alignment of the fiber sections 41, 42. The ultraviolet curing epoxy 45 also is more optically compatable with the fiber 41, 42 and tends not to bubble, cloud, or otherwise obstruct light transmitted through the fiber 41, 42.

The bond created by the ultraviolet curing epoxy, while not sufficient to maintain alignment after removal from the jig 35, 37, is able to maintain optical alignment while the five-minute epoxy 49 is curing.

The ultraviolet curing epoxy which we used was Norland NOA-61 resin (a trademark for tiolene series adhesive, sold by Norland Co. of New Jersey. This epoxy used had a viscosity of between 300 and 500 CPS (centipoise). A preferred range of viscosities would therefore probably be between 100 and 1500 CPS, and a wider range of viscosities, such as between 25 and 3000 centipoise, would likely work. The five-minute epoxy was viscous enough to maintain structural dimensions after cure. Preferably, the viscosity of the five-minute epoxy is at least twice that of the ultraviolet bonding epoxy and more likely at least four times the viscosity of the ultraviolet curing epoxy.

The ultraviolet curable epoxy 45 effects the optical transmission joint between the fibers 41, 42, while mechanical strength is maintained primarily by the five-minute epoxy 49. The ultraviolet curable epoxy 45 is applied only at the fiber ends 47, 48 and does not surround the fibers 41, 42. The five-minute epoxy 49, on the other hand, surrounds the fibers 41, 42 near the fiber ends 47, 48, providing tensile strength to the joint by allowing tensile strength to be exerted through shear loading between the fibers 41, 42 and the five-minute epoxy 49. This joint resulted in low losses, in the order of 0.1 dB. We anticipate that even lower losses can be achieved with this type of splice.

Figure 5:
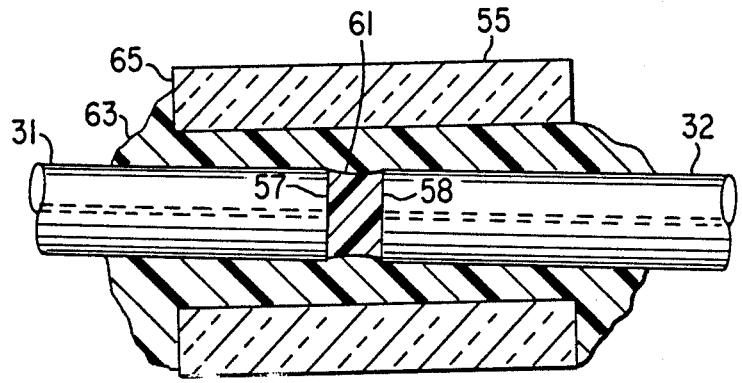
FIG. 5 shows details of a splice effected in accordance with another embodiment of the invention.

In order to ensure further integrity of splices made in accordance with the present invention, a glass sleeve 55 is inserted over a splice 50 as shown in FIG. 5. The glass sleeve 55 is first placed over one of the fibers such as fiber 32 shown in FIG. 3, between its positioner 37 and the ends 57, 58 to be spliced. The ends 57, 58 are brought into alignment and ultraviolet curable epoxy 61 is cured in the manner previously described. The sleeve 55 is then slid over the ends 57, 58 and five-minute epoxy 63 is applied at one end 65 of the sleeve 55. The five-minute epoxy 63 is allowed to flow inside the sleeve 55 so as to fill the space between the sleeve 55 and the fibers 31, 32 and the ultraviolet curable epoxy 61. The five minute epoxy, while more viscous then the ultraviolet curing epoxy, as described above, was sufficiently fluid to allow flow inside the sleeve. This allows the sleeve 55 to provide a rigid reinforcing structure and thereby prevent the fiber ends 57, 58 from separating from the ultraviolet curable epoxy 61. In the prototype splices thus far made, the glass sleeve 55 is made from pieces of capillary tube and no specific dimensions have been measured. We estimate that the sleeve has an inside dimension of approximately 500 μm. Clearly, the dimensions of the capillary tube 55 must be such that the sleeve may fit easily over the capable ends 57, 58 and the ultraviolet curable epoxy 61, while permitting the five-minute epoxy to flow inside of the sleeve 55. The sleeve 55 must be sufficiently narrow to avoid a tendency of the five-minute epoxy to form significant holidays or gaps between the sleeve 55 and the fibers 31, 32. The tubes are broken into small sections approximately 20 mm in length prior to use and in many cases the sleeve 55 may be considerably longer than the representation of FIG. 5.

While a specific prototype arrangement has been described, it is anticipated that various modifications will be made to the invention. It is anticipated that bonding agents other than the ultraviolet curing epoxy and the five-minute epoxy described may be substituted. The inventive techniques may be applied to mixed bonding of SMPM and single mode non-polarizing fibers, to bonding of other unlike fibers and to bonding of like fibers such as single mode to single mode. It is therefore intended that the invention be limited only as described by the claims.

What is claimed is:

1. Method of providing a splice at mating ends of a first optical fiber having a first mating end to a second optical fiber having a second mating end, in which each of the two optical fibers are aligned by an alignment jig in a manner to cause the mating ends to be juxtaposed, in which optical transmission is optimized with the aid of the jig and an optical signal detector, characterized by:
   applying a first bonding agent to at least one of the mating ends, the first bonding agent having an optical transmission characteristic which maintains a preferred optical sense of light transmitted through the optical fibers;
   aligning the mating ends to achieve maximum transmission while maintaining the first bonding agent between the mating ends;
   causing the first bonding agent to achieve a stabilized state; and
   applying a second bonding agent externally of said first bonding agent so as to substantially surround the first bonding agent and the first and second optical fibers at the mating ends and thereby effect mechanical rigidity of the splice.

2. Method as described in claim 1, further characterized by:
   the optical fiber being polarization maintaining fiber and the first bonding agent maintaining polarization of light transmitted between the first and second optical fibers.

3. Method as described in claim 1, further characterized by:
   the optical fiber being single mode polarization maintaining fiber and the first bonding material maintaining polarization of light transmitted through the optical fibers.

4. Method as described in claim 1, further characterized by:
   the optical fiber being single mode polarization maintaining fiber and the first bonding material maintaining polarization of light transmitted through the optical fibers.

5. Method as described in claim 1, further characterized by:
   the first bonding agent being ultraviolet curing epoxy; and
   the step of causing the first bonding agent to achieve its stabilized state being effected by applying actinic radiation to the first bonding agent.

6. Method as described in claim 5, further characterized by:
   the second bonding agent being self curing epoxy.

7. Method as described in claim 6, further characterized by:
   the first bonding agent having a viscosity of between 100 and 1500 centipoise.

8. Method as described in claim 6, further characterized by:
   the first bonding agent having a viscosity of between 100 and 1500 centipoise; and
   the second bonding agent having a viscosity of greater than 1500 centipoise.

9. A spliced joint between a first optical fiber and a second optical fiber, wherein the first and second optical fibers are single mode polarization maintaining fibers, said spliced joint formed by a process comprising the steps of:
   preparing mating ends on the first and second optical fibers;
   applying a first bonding agent to at least one of the mating ends, the first bonding agent having an optical transmission characteristic which maintains a preferred optical sense of light transmitted through the optical fibers;
   aligning the mating ends to achieve maximum transmission while maintaining the first bonding agent between the mating ends;
   causing the first bonding agent to achieve a stabilized state;
   applying a second agent externally of said first bonding agent so as to substantially surround the first bonding agent and the first and second optical fibers at the mating ends and thereby effect mechanical rigidity of the splice.

10. A spliced joint described in claim 9, wherein said process further comprises:
    placing a sleeve over one of the fibers;
    moving the sleeve over the mating ends after the first bonding agent is caused to achieve a stabilized state; and
    applying the second bonding agent so as to bond the sleeve over the mating ends, thereby reinforcing the splice with the sleeve.

11. Method of providing a splice at mating ends of a first optical fiber having a first mating end to a second optical fiber having a second mating end, in which each of the two optical fibers are aligned by an alignment jig in a manner to cause the mating ends to be juxtaposed, in which optical transmission is optimized with the aid of the jig and an optical signal detector, characterized by:
    placing a sleeve over one of the fibers;
    applying a first bonding agent to at least one of the mating ends, the first bonding agent having an optical transmission characteristic which maintains a preferred optical sense of light transmitted through the optical fibers;
    aligning the mating ends to achieve maximum transmission while maintaining the first bonding agent between the mating ends;
    causing the first bonding agent to achieve a stabilized state;
    applying a second bonding agent externally of said first bonding agent so as to substantially surround the first bonding agent and the first and second optical fibers at the mating ends and thereby effect mechanical rigidity of the splice;
    moving the sleeve over the mating ends after the first bonding agent is caused to achieve a stabilized state; and applying the second bonding agent so as to bond the sleeve over the mating ends, thereby reinforcing the splice with the sleeve.

12. Method as described in claim 11, further characterized by:
   the first bonding agent being ultraviolet curing epoxy; and
   the step of causing the first bonding agent to achieve its stabilized state being effected by applying actinic radiation to the first bonding agent.

13. Method as described in claim 12, further characterized by:
   the second bonding agent being self curing epoxy.

14. Method as described in claim 13, further characterized by:
   the first bonding agent having a viscosity of between 100 and 1500 centipoise.

15. Method as described in claim 13, further characterized by:
   the first bonding agent having a viscosity of greater than 1500 centipoise.

16. Method as described in claim 11, further characterized by:
   the optical fiber being polarization maintaining fiber and the first bonding agent maintaining polarization of light transmitted between the first and second optical fibers.

* * * * *